J. GAINEY.
Combined Filtering, Cooling and Water-Forcing Apparatus.
No. 204,663. Patented June 11, 1878.
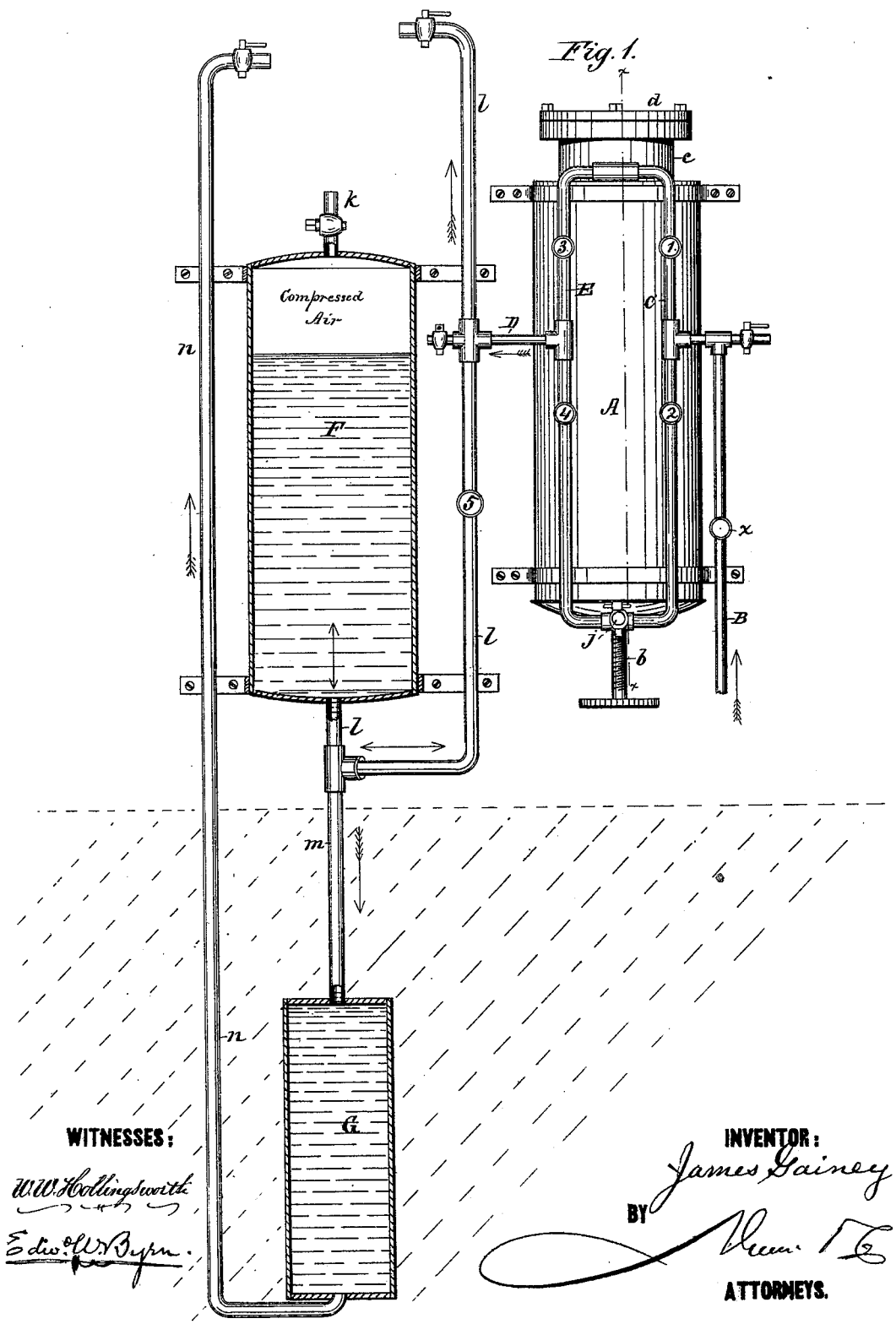

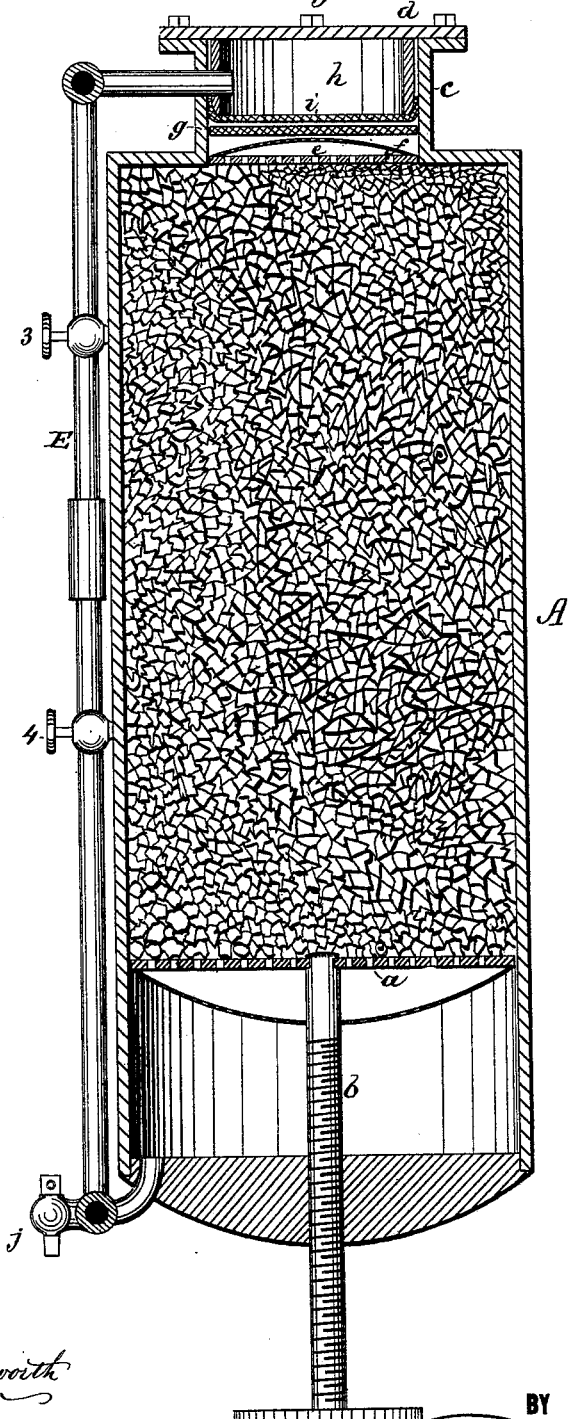

UNITED STATES PATENT OFFICE.

JAMES GAINEY, OF AUGUSTA, GEORGIA.

IMPROVEMENT IN COMBINED FILTERING, COOLING, AND WATER-FORCING APPARATUS.

Specification forming part of Letters Patent No. 204,663, dated June 11, 1878; application filed May 22, 1878.

*To all whom it may concern:*

Be it known that I, JAMES GAINEY, of Augusta, in the county of Richmond and State of Georgia, have invented a new and Improved Combined Filtering, Cooling, and Water-Forcing Apparatus; and I do hereby declare that the following is a full, clear, and exact description of the same, reference being had to the accompanying drawings, forming part of this specification, in which—

Figure 1 is a side elevation, with the compressed-air water-reservoir and the buried cooling-tank shown in section. Fig. 2 is an enlarged central longitudinal section of the filter through line $x\ x$ of Fig. 1.

The object of my invention is to provide an improved water-works for domestic and other purposes, designed to meet the wants of localities where the water is muddy or impure, or where there is no water-pressure, or where ice is scarce and there are no facilities for cooling the water.

To this end the invention consists in combining a filtering apparatus and an air-pressure water-reservoir with the distributing-pipes of the building, the said filtering apparatus being connected with the main water-supply, and discharging clear water into a tank having an air-cushion in the top, which tank at the same time serves as a reservoir for a larger and more expeditious supply of water than could be drawn direct from the filter, and also serves, by reason of the air-cushion, to force said purified water through all of the distributing-pipes of the building.

The invention also consists in combining with the air-pressure reservoir a tank with connecting-pipe, which tank is sunk a distance into the earth below the influence of the summer heat, through which tank the water is made to pass, and by which it is cooled, as hereinafter more fully described.

In the drawings, A represents the filter, which is constructed of a vertical cylindrical shell, having at one end an adjustable plunger, *a*, arranged to compress charcoal or other suitable filtering material by means of a screw-shaft, *b*, passing centrally through one of the heads of the cylinder, and terminating in a hand-wheel for turning said shaft and adjusting said plunger. This filter is designed to work under a pressure derived from the water-main, or, if there be no natural water-pressure, then the pressure is to be derived from a force-pump, and, as the pressure may vary, the plunger is adjusted to compress the filtering material to correspond with said varying pressure.

Inasmuch as the water traverses the shell longitudinally, the plunger is perforated to permit its passage through, and is also backed by a disk of gauze-wire or finely-perforated plate to catch and retain any particles of charcoal which may pass through the plunger. At the upper end of this cylinder is formed a neck, *c*, closed by a removable head, *d*, to form a chamber of less diameter than the body of the cylinder. Within this chamber is contained a perforated head, *e*, having a backing, *f*, of finer interstices to correspond to the backing of the plunger, and for the same purpose of retaining any particles of charcoal that may pass through. Just above the head *e f* is placed a disk of wool felt, *g*, and the head is held against the pressure of the charcoal by a ring, *h*, abutting against the outside head *d*, and fitted tightly against the walls of the chamber by a disk of felt, *i*, which is of larger diameter than this chamber, so as to fit between the walls of the chamber and the outer edge of the said ring. B is the general inlet supply-pipe leading from the water-main or from the force-pump, and connecting with the pipe C between the valves 1 2. D is the outlet-pipe from the filter, connecting with the pipe E (parallel to C) between the valves 3 4. Both the pipes C and E have at their extremities common connections with the ends of the cylinder, the upper connection causing said pipes to communicate with the space above the felt pads in the ring inside the reduced chamber, and the lower connection communicating with the water-space below the plunger.

With this arrangement it will be seen that the filtering may be effected in either direction, and the filter (when dirty) washed of its sediment by flushing in the opposite direction. For practical purposes, however, I prefer to filter up and wash down, because the gravity of the mud and sediment in that case assists its elimination from the water in filtering, as well as the washing out of the same from the filter; and for this reason I locate the muddy-water discharge-cock $j$ at the bottom. Now, in filtering up, the main supply-valve $x$ being open, valves 2 and 3 are opened, and the water passes in at the lower end of the cylinder, and, after traversing the charcoal and becoming purified, passes out through valve 3 to the discharge-pipe D. After the filter becomes choked up with muddy sediment and requires washing out, the valves 2 and 3 are closed and 1 and 4 opened, and then the water passes in the reverse direction through the filter, washing out the sediment. When, however, the discharge-pipe D of the filter communicates with a source of pure water, as hereinafter described, instead of opening valve 4 for the muddy water, I open the cock $j$ at the bottom, and run the sediment out through this. In filling the filter with charcoal or other filtering material this is effected through the removable head $d$.

With respect to the filter as thus described, I would state that it is of the same general form as that patented by me May 22, 1877, and is constructed pursuant to the modification mentioned in said patent and covered by the second claim therein. I therefore claim with respect to this filter only the features which are peculiar to it and distinct from the case referred to, the difference being chiefly in the construction of the upper portion of the cylinder and the filtering devices contained therein.

Now, the objections to water-filters are generally that, no matter how constructed, only a limited supply of water can be drawn from them at a time, and the flow is very slow, and it can only be drawn immediately at the filter, so that they are useless for such domestic purposes as filling bath-tubs in an upper story or a wash-tub in the kitchen; and, as the muddy character of the water in certain localities makes this a great desideratum, I have attempted to provide means for accomplishing the same.

F is a tank capable of holding about fifty gallons, more or less, and provided at the top with an air-cock, $k$, and at the bottom with a pipe, $l$, leading up and communicating through valve 5 with the pure-water discharge-pipe D of the filter, and extending from this point up through the rooms of the building. This tank F, it will be seen, serves a double purpose. In the first place it acts as a reservoir for the filtered water, so that the filter does not stop its action of filtering immediately after a supply is drawn, but the water continues to pass through until a large supply is stored up in the reservoir, so that the next time pure water is required in any quantity it is rapidly discharged without waiting for its filtration. In the second place, the storing up of water in this reservoir compresses a cushion of air in the top of the cylinder, so that when the pressure of the water-mains or pumps is discontinued the air cushion still acts to force the pure water stored in the same cylinder up through the various parts of the building.

With respect to this feature of my invention, I do not claim, broadly, the air-pressure reservoir, but only the combination of the same with a filter, whereby an unlimited supply of pure filtered water is available at all parts of the building without waiting for filtration, and without other means for effecting its elevation and distribution.

It will be seen, however, that I use but a single pipe, $l$, in connecting the filter, the air-chamber, and the distributing-pipe, the said pipe $l$ serving both as a supply and discharge pipe for the air-cushion reservoir.

In some localities where ice is not available some means for cooling the water is desirable, and for this purpose I extend from the pure-water reservoir F a pipe, $m$, leading down into the earth some forty or fifty feet, and communicating with a tank, G, buried at this depth, from which tank a pipe, $n$, leads up into the rooms of the building. Now, as the water in this tank is cooled by a stratum of earth which is below the effect of the summer's heat, it will be seen that the pure water may be cooled and at the same time drawn at different points of the building by the same pressure from the air-reservoir. The upper ends of the pure-water pipe $l$ and the pure-cold-water pipe $n$ may be connected at the top in the upper portion of the building, and the flow so controlled by valves that pure cold drinking-water or pure washing-water may be drawn, as desired.

The object of the valve 5 is to permit the pure-water supply in the air-chamber to be cut off from the stand-pipe, so that the pure water in the stand-pipe may be allowed to pass from hydrostatic pressure back through the filter, and wash it cleaner than could be accomplished by the more or less impure supply.

The object of the air-cock in the top of the chamber F is to permit the water in the latter to be drawn off, and a fresh quantity of air to be admitted to form a new cushion if the old one should become reduced by leakage.

As a modification of my invention, I may in some cases dispense with the cooling-tank G, and bury the air-cushion reservoir in the earth instead.

Having thus described my invention, what I claim as new is—

1. The combination, with the water-pipes of a building, of a filter and an air-cushion reservoir, the said filter being arranged to receive its water from the main supply and to discharge its pure water into the air-cushion reservoir, and the said air-cushion reservoir being interposed between the filter and the distributing-pipes of the house, substantially as described, and for the purpose set forth.

2. The air-cushion reservoir combined with the filter and connected with the pure-water discharge of the same by a single pipe, which forms both an inlet and discharge pipe for the said reservoir, substantially as described.

3. The combination, with a filter and air-cushion reservoir, of a cooling-tank buried in the earth and connected with the said reservoir, substantially as described.

4. The filter-cylinder, having a neck, $c$, forming a reduced chamber, and a removable head, $d$, in combination with the perforated head $e$ $f$, the felt disks $g\ i$, and the ring $h$, substantially as and for the purpose described.

The above specification of my invention signed by me this 21st day of May, 1878.

JAS. GAINEY.

Witnesses:
   SOLON C. KEMON,
   CHAS. A. PETTIT.